United States Patent [19]

Takago et al.

[11] 4,323,488

[45] Apr. 6, 1982

[54] METHOD FOR THE PREPARATION OF SILICONE-MODIFIED POLYOXYALKYLENE POLYETHERS AND ROOM TEMPERATURE-CURABLE COMPOSITIONS THEREWITH

[75] Inventors: Toshio Takago; Masatoshi Arai; Koji Futatsumori, all of Annaka, Japan

[73] Assignee: Shin-Etsu Chemical Company Limited, Tokyo, Japan

[21] Appl. No.: 130,565

[22] Filed: Mar. 14, 1980

[30] Foreign Application Priority Data

Mar. 26, 1979 [JP] Japan .................................. 54-35254
Mar. 30, 1979 [JP] Japan .................................. 54-38014

[51] Int. Cl.$^3$ ............................................ C08L 91/00
[52] U.S. Cl. ........................................ 528/32; 528/14; 528/15; 528/17; 528/18; 528/21; 528/22; 528/23; 528/25; 528/31; 528/34; 528/901; 556/444; 524/864; 524/865; 524/863
[58] Field of Search .................... 556/444; 528/15, 31, 528/32, 901, 34, 25, 17, 18, 21, 14, 23, 22; 260/18 S

[56] References Cited

U.S. PATENT DOCUMENTS

| | | | |
|---|---|---|---|
| 3,218,344 | 11/1965 | Bailey | 528/15 |
| 3,887,602 | 6/1975 | Thurn et al. | 556/444 |
| 3,892,707 | 1/1975 | Itoh et al. | 528/15 |

*Primary Examiner*—Melvyn I. Marquis
*Attorney, Agent, or Firm*—Toren, McGeady & Stanger

[57] ABSTRACT

The present invention provides a novel room temperature-curable composition based on a polyoxyalkylene polyether, e.g. polyoxypropylene, admixed with a curing agent which is very stable when kept in a dry atmosphere or in a hermetically sealed condition but is readily cured when exposed to atmospheric air containing moisture into a rubber-like elastomer. The polyoxyalkylene polyether is terminated at both molecular chain ends with organosilyl groups having alkenyloxy groups bonded to the silicon atoms and can be prepared by the addition reaction of an allyl-terminated polyoxyalkylene polyether with an organosilane or organopolysiloxane compound having at least one silicon-bonded hydrogen atom and at least one silicon-bonded alkenyloxy group in a molecule in the presence of a platinum catalyst.

7 Claims, No Drawings

METHOD FOR THE PREPARATION OF SILICONE-MODIFIED POLYOXYALKYLENE POLYETHERS AND ROOM TEMPERATURE-CURABLE COMPOSITIONS THEREWITH

BACKGROUND OF THE INVENTION

The present invention relates to a method for the preparation of a novel polyoxyalkylene polyether modified at the chain terminals thereof with organosilicon-containing groups and a room temperature-curable composition formulated with the polyoxyalkylene polyether.

In the prior art, there are known a wide variety of so-called room temperature-curable compositions stable and storable when kept with hermetic sealing but capable of rapidly being cured when exposed to the atmospheric air containing moisture even at room temperature to be converted into a rubbery solid. These compositions are classified into so-called "two-package" and "one-package" types. The compositions of the former type are prepared and stored in two packages containing different kinds or different combinations of the components and the contents of the two packages are blended directly before use of the composition while the compositions of the latter type are prepared by blending all of the components and storable as such with stability in one package. The one package type compositions are preferred, of course, owing to the convenience and better workability, especially, when the composition is directed to the use such as a sealing material, adhesive agent and the like.

As a class of such room temperature-curable compositions are known several kinds of organopolysiloxane compositions crosslinkable and curable by the hydrolysis-condensation reaction of hydrolyzable groups bonded to the silicon atoms including acyloxy groups, amino groups, oxime groups, aminoxy groups, alkoxy groups and the like.

These silicone compositions produce various kinds of condensation products according to the types of the condensation reaction such as carboxylic acids, e.g. acetic acid, amines, oximes, alcohols, amides, ketones and the like.

Some of the problems in these organopolysiloxane-based curable compositions are the water-repellency and oil-repellency of the surfaces of the cured products thereof leading to poor adhesion of aqueous or oily paints and, on the contrary, increased sticking of dusts and dirts as well as the expensiveness of the silicone products in general so that their use as a sealing material or adhesive agent is limited.

On the other hand, there are also known and widely used polysulfide-based and polyurethane-based curable compositions. However, the polysulfide-based curable compositions are defective due to the necessity of formulating a peroxide compound such as lead peroxide, calcium peroxide, manganese peroxide and the like as the curing agent bringing about a problem of toxicity and environmental pollution by these peroxide compounds as well as due to their inherently poor anti-weathering resistance and heat stability. The polyurethane-based curable compositions suffer from the problems of foaming in the course of curing, and yellowish coloring and poor water resistance of the cured products.

There has recently been proposed a room temperature-curable composition based on a polyoxyalkylene polyether modified at both chain terminals with organosilyl groups having hydrolyzable atoms or groups bonded to the silicon atoms (see, for example, Japanese Patent Disclosure No. 50-156599). The organosilicon-modified polyoxyalkylene polyether is prepared by the addition reaction of a polyoxyalkylene polyether having allyl groups at both terminals of the chain molecules thereof with a silane compound having a hydrogen atom directly bonded to the silicon atom and at least one hydrolyzable atom or groups bonded to the silicon atom as represented by the general formula.

$$H\text{-}Si(R)_b(X)_{3-b'},$$

where R is an monovalent organic group, e.g. hydrocarbon group, X is a hydrolyzable atom or group and b is a number of zero, 1 or 2.

The organosilicon-modified polyoxyalkylene polyether of the above described type has several problems as follows. When the hydrolyzable atom or group denoted by X is a halogen atom, it must be first converted into a hydrolyzable group by reacting with an alcohol, carboxylic acid, amine, acid amide, dialkylhydroxylamine or oxime compound. When the hydrolyzable group denoted by X is an alkoxy group, a considerably large amount of a curing catalyst such as a metal salt of carboxylic acids is required to be formulated in the composition leading necessarily to decreased heat stability and anti-weathering resistance of the cured products.

Furthermore, when the group X is an acyloxy group, a corrosive gas with unpleasant odor is produced in the course of curing such as a carboxylic acid which also limits the formulation of a filler with basicity in the composition. When the group X is an acid amide group, the instability of the silane compound of the above given general formula retards and disturbs quantitative proceeding of the addition reaction between the allyl-terminated polyoxyalkylene polyether and the silane compound.

SUMMARY OF THE INVENTION

It is therefore an object of the present invention to provide a novel and improved room temperature-curable composition free from the above described problems in the prior art curable compositions or, more particularly, to a room temperature-curable composition based on an organosilicon-modified polyoxyalkylene polyether.

A further object of the present invention is to provide a novel method for the preparation of the above mentioned organosilicon-modified polyoxyalkylene polyether.

Thus, the room temperature-curable composition of the invention comprises (a) 100 parts by weight of a polyoxyalkylene polyether modified with organosilicon groups at the chain terminals thereof as represented by the general formula

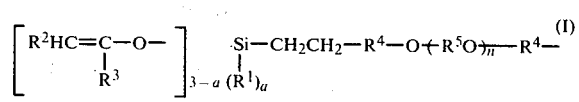

-continued

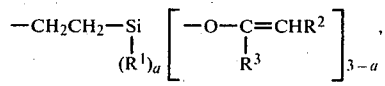

where $R^1$ is a substituted or unsubstituted monovalent hydrocarbon group or a triorganosiloxy group, $R^2$ is a hydrogen atom or a substituted or unsubstituted monovalent hydrocarbon group, $R^3$ is a substituted or unsubstituted monovalent hydrocarbon group, $R^4$ is a divalent hydrocarbon group, $R^5$ is a divalent hydrocarbon group having from 1 to 4 carbon atoms, a is a number of zero, 1 or 2 and n is a positive integer, and having an average molecular weight in the range from 400 to 15,000, and (b) from 0.01 to 10 parts by weight of a curing agent.

The above described organosilicon-modified polyoxyalkylene polyether of the general formula (I) is prepared by the addition reaction of a polyoxyalkylene polyether terminated at both chain ends with allyl groups and represented by the general formula

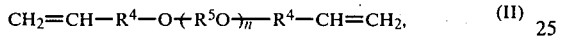

where $R^4$, $R^5$ and n each have the same meaning as defined above, with an alkenyloxy-containing organosilane compound having a hydrogen atom directly bonded to the silicon atom as represented by the general formula

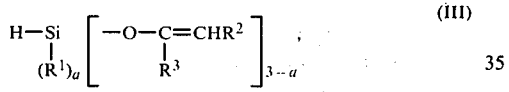

where $R^1$, $R^2$, $R^3$ and a each have the same meaning as defined above, in the presence of a platinum catalyst.

DETAILED DESCRIPTION OF THE PREFERRED EMBODIMENTS

As is described above, the alkenyloxysilyl-terminated polyoxyalkylene polyether of the general formula (I) as the base component of the inventive curable composition is prepared by the addition reaction of the allyl-terminated polyoxyalkylene polyether of the general formula (II) with the silane compound of the general formula (III) having a silicon-bonded hydrogen atom in the presence of a platinum catalyst.

In the above general formulas, $R^1$ is a substituted or unsubstituted monovalent hydrocarbon group having from 1 to 18 or, preferably, from 1 to 8 carbon atoms or a triorganosiloxy group. The monovalent hydrocarbon group, which is preferably free from aliphatic unsaturation, is exemplified by alkyl groups such as methyl, ethyl, propyl and butyl groups, cycloalkyl groups such as cyclopentyl and cyclohexyl groups, aryl groups such as phenyl and tolyl groups and aralkyl groups such as benzyl group as well as those groups derived from the above named hydrocarbon groups by substituting halogen atoms or cyano groups and the like for part or all of the hydrogen atoms in the hydrocarbon groups. The triorganosiloxy group as the group $R^1$ is represented by the general formula $R'_3SiO-$, where $R'$ is a monovalent hydrocarbon group having from 1 to 18 carbon atoms similar to those hydrocarbon groups above named as the exemplification of the group $R^1$ per se, three of the groups $R'$ in a triorganosiloxy group being identical with or different from each other.

The group represented by the symbol $R^2$ is a hydrogen atom or a monovalent hydrocarbon group while the group $R^3$ is a monovalent hydrocarbon group, the hydrocarbon group being exemplified by those groups given above as the examples of the group $R^1$. The most preferred hydrocarbon groups for $R^2$ and $R^3$ are methyl and ethyl groups.

The number a in the formula (I) or (III) is zero, 1 or 2 so that at least one alkenyloxy group is bonded to the silicon atom of the silyl group.

Thus, some of the examples for the silane compound in conformity with the general formula (III) and the above given definitions of the symbols are as follows, in which, and hereinafter, Me, Et and Ph stand for methyl, ethyl and phenyl groups, respectively.

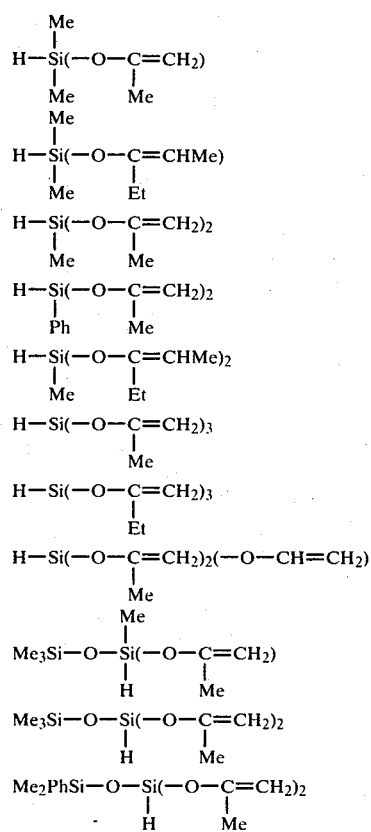

The allyl-terminated polyoxyalkylene polyether to be modified with the above described organosilicon compound is represented by the general formula (II), in which $R^4$, $R^5$ and n each have the meaning as defined above. In particular, $R^4$ is a divalent hydrocarbon group having from 1 to 20 or, preferably, from 1 to 4 carbon atoms such as alkylene groups and $R^5$ is a divalent hydrocarbon group having from 1 to 4 carbon atoms exemplified by methylene, ethylene, propylene and butylene groups. It should be noted that the groups $R^5$ in a molecule are not limited to a single kind of alkylene groups. For example, the main chain of the polyoxyalkylene polyether may have a mixed polyoxyalkylene structure such as a polyoxyethylene-polyoxypropylene structure according to need.

On the other hand, the number n in the general formulas (I) or (II) is a positive integer of such a value that the organosilicon-modified polyoxyalkylene polyether of the general formula (I) may have an average molecular weight in the range from 400 to 15,000.

The above described allyl-terminated polyoxyalkylene polyether can be obtained according to the procedure described in, for example, Japanese Patent Disclosures Nos. 50-156599, 53-12927 and 53-134095.

In the addition reaction of the allyl-terminated polyoxyalkylene polyether and the alkenyloxy-containing organosilicon compound, the latter compound is used in an amount of at least equimolar to the terminal unsaturation of the polyoxyalkylene polyether. It is desirable that the alkenyloxy-containing organosilicon compound is used in an excess amount over the equimolar amount to the terminal unsaturation of the polyoxyalkylene polyether in order that the addition reaction can proceed to an extent as complete as possible. The addition reaction is carried out at a temperature in the range from 30° to 150° C. or, preferably, from 40° to 120° C.

The platinum catalyst used to catalytically accelerate the addition reaction between the allyl-terminated polyoxyalkylene polyether and the alkenyloxy-containing organosilicon compound is exemplified by metallic platinum, e.g. platinum black, active carbon supporting platinum, chloroplatinic acid and addition compounds or complex compounds of chloroplatinic acid with alcohols, olefins and aldehydes.

The above addition reaction can be carried out without the use of an organic solvent although it is optional or recommendable to add an organic solvent when difficulties are encountered in agitating the reaction mixture owing to the high viscosity of the starting materials. The organic solvent suitable as the diluent is exemplified by aromatic hydrocarbon solvents such as benzene, toluene and xylene, aliphatic hydrocarbon solvents such as hexane and octane, ether solvents such as diethyl ether and dibutyl ether, ketone solvents such as methylethylketone and halogenated hydrocarbon solvents such as trichloroethylene.

The alkenyloxy-containing organosilicon compounds are not limited to those represented by the general formula (III) above, in which the alkenyloxy group or groups are bonded to the same silicon atom to which a hydrogen atom is bonded directly. Instead, the alkenyloxy group or groups may be bonded to the silicon atom or atoms other than the silicon atom to which a hydrogen atom is directly bonded and such an alkenyloxy-containing organosilicon compound can pertain to the addition reaction with the allyl-terminated polyoxyalkylene polyether likewise. Several examples of such alkenyloxy-containing organosilicon compounds are given below including polysiloxane compounds as well as those compounds having silethylene linkages:

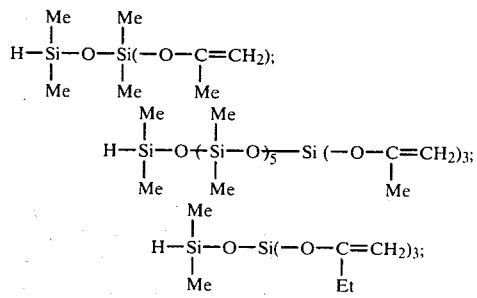

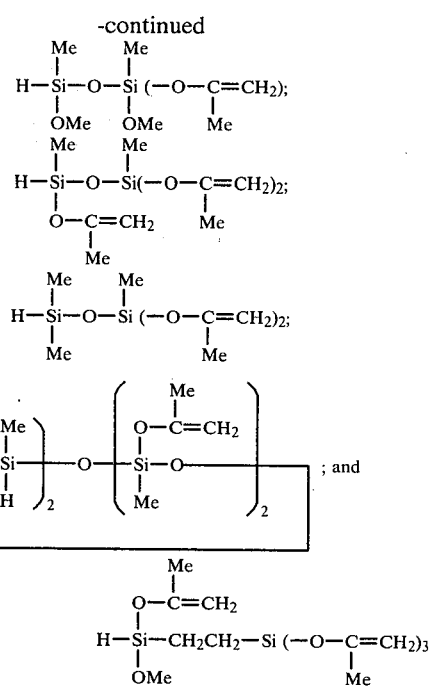

The alkenyloxy-containing organosilane or organopolysiloxane above described can be prepared by the reaction of a ketone compound with an organosilane or organopolysiloxane having a hydrogen atom directly bonded to the silicon atom and one or more of halogen atoms directly bonded to the silicon atom or atoms in the presence of an acid acceptor such as triethylamine, dimethylaniline and the like and a reaction catalyst such as zinc chloride, copper chloride and the like according to need.

The room temperature-curable composition of the present invention is prepared by merely blending the polyoxyalkylene polyether terminated at both chain ends with the alkenyloxy-containing organosilicon groups as represented by the general formula (I) with a suitable curing agent. It is preferable that the organosilicon-modified polyoxyalkylene polyether above mentioned has at least three alkenyloxy groups in a molecule in order to obtain a sufficient degree of curing.

The curing agent to be admixed with the organosilicon-modified polyoxyalkylene polyether includes both curing accelerators or curing catalysts and crosslinking agents.

The curing accelerator is exemplified by metal salts of carboxylic acids such as lead 2-ethylhexoate, dibutyltin dilaurate, dibutyltin diacetate, butyltin tri-2-ethylhexoate, iron 2-ethylhexoate, cobalt 2-ethylhexoate, manganese 2-ethylhexoate, zinc 2-ethylhexoate, tin(II) caprylate, tin naphthenate, tin oleate, tin butyrate, titanium naphthenate, zinc naphthenate, cobalt naphthenate, zinc stearate and the like; organic esters of titanic acid such as tetrabutyl titanate, tetra(2-ethylhexyl) titanate, triethanolamine titanate, tetra(isopropenoxy) titanate and the like; organotitanium compounds such as organosiloxy titaniums, β-carbonyl titanium and the like; aminoalkyl-substituted alkoxysilanes such as 3-aminopropyl triethoxysilane, N-(trimethoxysilylpropyl)ethylenediamine and the like; amine compounds and salts thereof such as hexylamine, dodecylamine phosphate and the like; quaternary ammonium salts such as benzyl triethylammonium acetate and the like; alkali metal salts of lower aliphatic carboxylic acids such as potassium acetate, lithium oxalate and the like; dialkyl hydroxylamine such as dimethyl hydroxylamine, diethyl hydroxylamine and the like; and guanidine compounds and guanidyl-containing organosilanes or organopolysiloxanes such as those expressed by the structural formulas

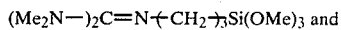

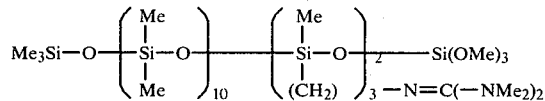

The crosslinking agent is exemplified by several kinds of alkenyloxy-containing silane compounds expressed by the structural formulas:

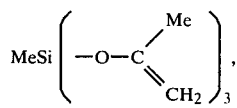

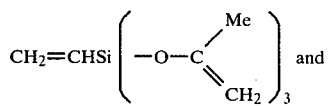

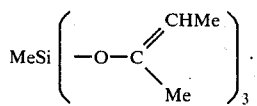

The use of the curing agent is not limited to a single compound among the above named compounds but two kinds or more of the compounds may be used in combination according to need. Among the above named curing agents, the guanidine compounds and guanidyl-containing organosilanes or organopolysiloxanes are particularly recommended when an improved adhesive bonding of the cured composition to the substrate surface is desired in addition to smooth and rapid proceeding of the curing reaction.

The amount of the curing agent to be admixed with the organosilicon-terminated polyoxyalkylene polyether as the base component should be determined depending on the particular kinds of the curing agent and the desired curing velocity but it is usually used in an amount of from 0.01 to 10 parts by weight per 100 parts by weight of the polyoxyalkylene polyether. When the amount of the curing agent is insufficient, satisfactory curing velocity cannot naturally be obtained along with poor properties of the cured products while an excessively large amount of the curing agent leads to the viscosity increase in the course of blending of the components resulting in the disadvantages of poor storability of the composition and of the inconvenience in the application of the composition as a sealing material and the like.

The curable composition of the present invention can be admixed, according to need, with various kinds of fillers such as fumed silica, precipitated silica, powdered quartz, diatomaceous earth, calcium carbonate, fatty acid-treated calcium carbonate, magnesium carbonate, carbon black, clay, calcined clay, titanium dioxide, zinc oxide, $\alpha$- and $\gamma$-iron oxides, bentonite, organic complexes of bentonite, powdered glass, glass microballoons, asbestos, comminuted glass fiber, powdered mica and powder of fused silica as well as those powders obtained by the surface treatment of the above named inorganic fillers as the typical examples of inorganic fillers as well as powders of polystyrene, polyvinyl chloride, polypropylene and the like as the examples of organic fillers.

Further, the curable composition of the present invention can be formulated with a dehydrating agent and storability-improver such as oxime silanes, oxime group-containing organopolysiloxanes, aminosilanes, amino group-containing organopolysiloxanes, amidosilanes, amido group-containing organopolysiloxanes, dialkylaminoxysilanes, dialkylaminoxy group-containing organopolysiloxanes, alkenyloxysilanes, alkenyloxy group-containing organopolysiloxanes, alkoxysilanes and alkoxy group-containing organopolysiloxanes.

The fillers above mentioned as well as the silanes and organopolysiloxanes as a dehydrating agent or storability-improver should be added in the inventive composition in amounts not to adversely affect the objects of the present invention and they are also admixed in the inventive composition after drying to remove any trace amount of moisture.

In addition, it is optional to formulate the inventive composition with various kinds of conventional additives such as pigments, dyestuffs, aging retarders, antioxidants, anti-static agents, flame retardants, e.g. antimony oxide and chlorinated paraffins, heat-conductivity improvers, e.g. boron nitride, and so-called carbon-functional silanes having amino groups, epoxy groups and thiol groups, and plasticizers, e.g. butyl benzylphthalate and chlorinated paraffins.

The curable composition of the present invention is prepared by uniformly blending the organosilicon-modified polyoxyalkylene polyether and the curing agent together with the optional additives according to need in an atmosphere of dry air or nitrogen. It is optional that the inventive composition is diluted with an organic solvent to facilitate the application of the composition to practical uses. The organic solvents suitable for the purpose are exemplified by hydrocarbon solvents such as toluene and petroleum ether, ketone solvents, ester solvents and the like.

The curable composition of the present invention is very stable when kept in a hermetically sealed condition but is readily cured when exposed to atmospheric air by the reaction with the atmospheric moisture. In particular, excellent adhesive bonding is obtained between the surface of a substrate, especially, of metals and the cured composition when curing of the composition has been effected in contact with the substrate surface. Further, additional advantages are obtained owing to the absence of toxic or corrosive gaseous products emitted in the course of curing so that the curable composition of the invention can be used without the problem of rusting on the metal surface or health problem of the workers as a sealing material, caulking material, adhesive agent or coating material in a wide variety of application fields.

Following are the examples to illustrate the preparation of alkenyloxy-containing organosilanes to be reacted with the allyl-terminated polyoxyalkylene polyether and the addition reaction between the alkenyloxy-containing organosilicon compound and the allyl-terminated polyoxyalkylene polyether as well as to illustrate the preparation and properties of the curable compositions according to the invention.

EXAMPLE 1

Preparation of methyl diisopropenoxysilane

Into a flask were introduced 348 g (6.0 moles) of acetone, 303 g (3.0 moles) of triethylamine and 1 g of zinc chloride and 125 g (1.0 mole) of methyldichlorosilane was added gradually dropwise into the reaction mixture at room temperature. As the silane was dropped, the reaction mixture turned light brown in color and the temperature of the reaction mixture was gradually increased to 35° C.

After the end of the addition of the methyldichlorosilane, the reaction mixture was agitated for 8 hours at room temperature followed by further agitation at 50° C. for additional one hour. After cooling to room temperature, the reaction mixture was filtered and the filtrate was subjected to distillation under reduced pressure to give 103 g of a fraction boiling at 53° C. under a pressure of 133 mmHg.

The above obtained fraction was identified to be methyl diisopropenoxysilane by the infrared absorption spectral analysis, gas chromatography and elementary analysis. The above given yield was about 65% of the theoretical value based on the methyl dichlorosilane.

EXAMPLE 2

Preparation of

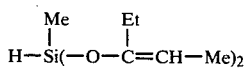

Into a flask were introduced 516 g (6.0 mole) of diethylketone, 303 g (3.0 moles) of triethylamine and 1 g of zinc chloride and 125 g (1.0 mole) of methyldichlorosilane was added to the reaction mixture dropwise at room temperature gradually over a period of 30 minutes followed by agitation at 50° C. for 16 hours. During the dropping of the silane, the temperature of the reaction mixture remained almost unchanged. After cooling to room temperature, the reaction mixture was filtered and the filtrate was subjected to distillation under reduced pressure to give 128 g of a fraction boiling at 85° C. under a pressure of 13 mmHg.

The thus obtained fraction was identified to be an alkenyloxy-containing silane expressed by

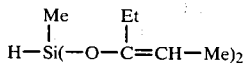

by the infrared absorption spectroscopy, gas chromatography and elementary analysis. The above given yield was about 60% of the theoretical value based on the methyldichlorosilane.

EXAMPLE 3

Preparation of dimethyl monoisopropenoxysilane

Into a flask were introduced 116 g (2.0 moles) of acetone, 151 g (1.5 moles) of triethylamine and 2 g of copper(I) chloride and 94 g (1.0 mole) of dimethyl monochlorosilane was added dropwise into the reaction mixture at room temperature over a period of 30 minutes followed by heating at 30° to 50° C. for 8 hours. After cooling to room temperature, the reaction mixture was filtered and the filtrate was subjected to distillation to give 110 g of the objective dimethyl monoisopropenoxysilane. The above given yield was about 70% of the theoretical value.

EXAMPLE 4

Into a flask were introduced 150 g of a polyoxypropylene terminated at both chain ends with allyloxy groups and having a viscosity of 800 centistokes at 25° C. corresponding to an average molecular weight of about 4200, 18 g of methyldiisopropenoxysilane prepared in Example 1, 0.3 g of a solution of chloroplatinic acid in isopropyl alcohol in a concentration of 2% by weight as platinum and 200 g of toluene and the reaction mixture was agitated first at 90° C. for 1 hour and then at 120° C. for 2 hours to effect the addition reaction.

The gas chromatographic analysis of the reaction mixture after cooling for the content of unreacted methyldiisopropenoxysilane indicated that the degree of the addition reaction was 98%. The viscosity of the thus obtained organosilicon-modified alkenyloxy-containing polyoxypropylene determined after removal of volatile matter was 970 centistokes at 25° C. Determination of the unsaturation in this product indicated almost complete disappearance of the terminal allyloxy groups.

EXAMPLE 5

Into a flask were introduced 150 g of the same allyloxy-terminated polyoxypropylene as used in the preceding example, 20 g of the alkenyloxy-containing silane prepared in Example 2, 0.3 g of the same solution of chloroplatinic acid as used in the preceding example and 200 g of toluene and the reaction mixture was agitated first at 90° C. for 1 hour and then at 120° C. for 10 hours to effect the addition reaction. The resultant organosilicon-modified alkenyloxy-containing polyoxypropylene had a viscosity of 950 centistokes at 25° C. after removal of the volatile matter. The gas chromatographic analysis and determination of the terminal allyl groups in this product indicated that the degree of addition was 82%.

EXAMPLE 6

Into a flask were introduced 150 g of a polyoxypropylene terminated at both chain ends with allyloxy groups and having a viscosity of 2200 centistokes at 25° C. corresponding to an average molecular weight of about 6000, 9 g of the dimethyl monoisopropenoxysilane prepared in Example 3, 0.3 g of the same solution of chloroplatinic acid as used in Example 4 and 100 g of toluene and the reaction mixture was agitated first at 40° C. for 3 hours and then at 60° C. for 8 hours to effect the addition reaction. The resultant organosilicon-modified alkenyloxy-containing polyoxypropylene had a viscosity of about 3960 centistokes at 25° C. after removal of the volatile matter. The degree of addition was 98% and the determination of the unsaturation indicated almost complete disappearance of the terminal allyl groups in the polyoxypropylene.

EXAMPLE 7

Into a reaction flask were introduced 150 g of a polyoxypropylene terminated at both chain ends with allyloxy groups and having a viscosity of 2050 centistokes at 25° C. corresponding to an average molecular weight of about 5600, 18 g of 1,1,3-trimethyl-3,3-di(isopropenoxy)disiloxane, 0.4 g of the same solution of chloroplatinic acid as used in Example 4 and 100 g of toluene and the reaction mixture was agitated at 110° C. for 6 hours to effect the addition reaction. The resultant organosilicon-modified alkenyloxy-containing polyoxypropylene had a viscosity of 2630 centistokes at 25° C. The gas chromatographic analysis and the determination of the unsaturation in this product indicated that the degree of addition was 89%.

EXAMPLE 8

Into a flask were introduced 150 g of the same allyloxy-terminated polyoxypropylene as used in Example 7, 28 g of 1,3,5,7-tetramethyl-1,3-di(isopropenoxy)-cyclotetrasiloxane, 0.2 g of the same solution of chloroplatinic acid as used in Example 4 and 100 g of toluene and the reaction mixture was agitated at 100° C. for 6 hours to effect the addition reaction. The resultant organosilicon-modified alkenyloxy-containing polyoxypropylene has a viscosity of 3250 centistokes at 25° C. and the gas chromatographic analysis and determination of the unsaturation in this product indicated a degree of addition of 95%.

EXAMPLE 9

A curable composition was prepared by uniformly blending, in an atmosphere of dry nitrogen, 100 parts by weight of the organosilicon-modified polyoxypropylene prepared in Example 4, 40 parts by weight of precipitated calcium carbonate and 1.0 part by weight of a guanidyl group-containing silane compound expressed by the formula

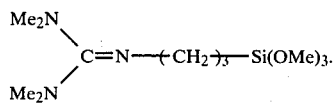

The thus prepared composition was shaped into a sheet of 2 mm thickness and kept in an atmosphere of 60% relative humidity at 20° C. for 7 days to be cured into a rubbery elastomer sheet. The mechanical properties of this cured sheet as determined in accordance with the procedure specified in JIS K 6301 were as follows: ultimate elongation 280%; tensile strength 21 kg/cm$^2$; and hardness 34.

On the other hand, the composition was packaged in a tube of aluminum foil hermetically and stored at 20° C. for 3 months with no noticeable changes in the consistency, workability and curing property of the composition as well as in the mechanical properties of the rubbery elastomer sheet prepared by curing the composition after the storage test.

For comparison, the organosilicon-modified alkenyloxy-containing polyoxypropylene in the above formulation was replaced with the same amount of a polyoxypropylene having about the same average degree of polymerization but terminated at both chain ends with alkoxy-containing silyl groups expressed by the formula

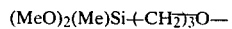

to give a similar composition. This composition was spread in a sheet of 2 mm thickness and kept in an atmosphere of 60% relative humidity at 20° C. for 7 days without curing at all.

EXAMPLE 10

A curable composition was prepared by uniformly blending in a dry atmosphere 100 parts by weight of the organosilicon-modified polyoxypropylene obtained in Example 5, 20 parts by weight of butyl benzylphthalate, 20 parts by weight of a finely divided silica filler having a specific surface area of 200 m$^2$/g and surface-blocked with trimethylsilyl groups, 3 parts by weight of titanium dioxide and 0.5 part by weight of dibutyltin dilaurate.

This composition was shaped into a sheet of 2 mm thickness and kept in an atmosphere of 60% relative humidity at 20° C. for 7 days to be cured into a rubber-like elastomer sheet. The mechanical properties of this cured sheet were: ultimate elongation 430%; tensile strength 18 kg/cm$^2$; and hardness 26.

On the other hand, the composition was packaged in a tube of aluminum foil hermetically and stored at 20° C. for 3 months with no noticeable changes in the flowability or extrudability from the tube and the curing of the composition after the storage test took place as rapidly as in the curing of the composition directly after preparation into a rubbery elastomer when exposed to atmospheric air containing moisture.

For comparison, the organosilicon-modified alkenyloxy-containing polyoxypropylene in the above formulation was replaced with the same amount of a polyoxypropylene having about the same average degree of polymerization but terminated at both chain ends with alkoxy-containing silyl groups expressed by the formula

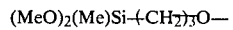

to give a similar composition.

This composition was shaped into a sheet of 2 mm thickness and kept in an atmosphere of 60% relative humidity at 20° C. for 7 days into a rubber-like elastomer sheet having the mechanical properties of ultimate elongation 430%, tensile strength 18 kg/cm$^2$ and hardness 26. This comparative composition was packaged in a tube of aluminum foil hermetically and kept at 20° C. to be found that it became hardened and unextrudable from the tube only after 7 days.

EXAMPLE 11

A curable composition was prepared by uniformly blending 100 parts by weight of the organosilicon-modified alkenyloxy-containing polyoxypropylene obtained in Example 6, 15 parts by weight of chlorinated paraffin containing 40% by weight of chlorine, 100 parts by weight of heavy calcium carbonate, 1 part by weight of dibutyltin dioctoate and 2 parts by weight of 3-aminopropyl triethoxysilane with subsequent defoaming.

Curing of this composition into a rubber-like elastomer sheet and measurement of the mechanical properties of the sheet were carried out in the same manner as in the preceding example to give the results of ultimate elongation 280%, tensile strength 26 kg/cm$^2$ and hardness 35.

This composition was storable at 20° C. for 3 months or longer when kept in a hermetically sealed condition.

EXAMPLE 12

Into a flask were introduced 300 g of a polyoxypropylenepolyoxyethylene polyether terminated at both chain ends with 4-pentenyloxy groups —O—CH$_2$CH$_2$CH$_2$CH$_2$=CH$_2$ and having a viscosity of about 1200 centistokes at 25° C. corresponding to an average molecular weight of about 3500, of which the molar ratio of the oxyethylene groups and oxypropylene groups was 20:80, 32.5 g of methyl diisopropenoxysilane prepared in Example 1, 0.3 g of the same solution of chloroplatinic acid as used in Example 4 and 200 g of toluene and the addition reaction was carried out by agitating the reaction mixture first at 90° C. for 1 hour and then at 120° C. for 2 hours.

After cooling to room temperature, the unreacted methyl diisopropenoxysilane and toluene were removed from the reaction mixture under a reduced pressure to leave 320 g of a pale yellow liquid product having a viscosity of about 1400 centistokes at 25° C., which was identified to be the desired addition product from the results of the infrared absorption spectroscopy, determination of the aliphatic unsaturation and elementary analysis.

A curable composition was prepared in the same manner as in Example 9 by use of 100 parts by weight of the above obtained addition product instead of the alkenyloxysilyl-terminated polyoxypropylene in Example 9.

The results of the curing test and the storability test of this composition were almost the same as in Example 9 with following mechanical properties of the cured product: ultimate elongation 320%; tensile strength 19 kg/cm$^2$; and hardness 29.

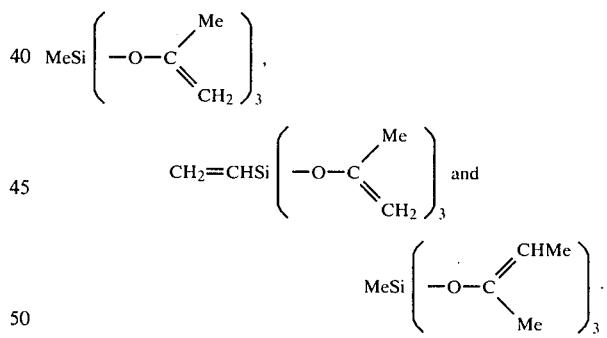

What is claimed is:

1. A room temperature-curable composition which comprises
   (a) 100 parts by weight of a polyoxyalkylene polyether modified with alkenyloxy-containing organosilicon groups at the chain terminals represented by the general formula

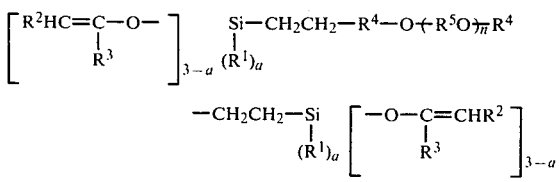

where $R^1$ is a substituted or unsubstituted monovalent hydrocarbon group or a triorganosiloxy group, $R^2$ is a hydrogen atom or a substituted or unsubstituted monovalent hydrocarbon group, $R^3$ is a substituted or unsubstituted monovalent hydrocarbon group, $R^4$ is a divalent hydrocarbon group, $R^5$ is a divalent hydrocarbon group having from 1 to 4 carbon atoms, a is a number of zero, 1 or 2 and n is a positive integer, and having an average molecular weight in the range from 400 to 15,000, and
   (b) from 0.01 to 10 parts by weight of a curing agent.

2. The room temperature-curable composition as claimed in claim 1 where $R^3$ is selected from the class consisting of a hydrogen atom, a methyl group and an ethyl group.

3. The room temperature-curable composition as claimed in claim 1 wherein $R^1$ is a methyl group or a phenyl group.

4. The room temperature-curable composition as claimed in claim 1 wherein the polyoxyalkylene polyether terminated at both chain ends with the alkenyloxy-containing organosilicon groups has at least three alkenyloxy groups represented by the general formula

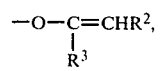

where $R^2$ and $R^3$ each have the same meaning as defined above, in a molecule.

5. The composition of claim 1 wherein the curing agent is a curing accelerator, curing catalyst, or crosslinking agent.

6. The composition of claim 5 wherein the curing accelerator is a metal salt of a carboxylic acid, organic ester of titanic acid, aminoalkyl substituted alkoxysilane, amine, amine salt, quaternary ammonium salt, guanidine compounds, guanidyl-containing organosilane or guanidyl-containing organopolysiloxane.

7. The composition of claim 5 wherein the crosslinking agent is an alkenyloxy-containing silane selected from the group consisting of